United States Patent
Koskan et al.

(10) Patent No.: US 8,296,058 B2
(45) Date of Patent: Oct. 23, 2012

(54) METHOD AND APPARATUS OF OBTAINING IMPROVED LOCATION ACCURACY USING MAGNETIC FIELD MAPPING

(75) Inventors: Patrick D. Koskan, Lake Worth, FL (US); Charles B. Swope, Coral Springs, FL (US)

(73) Assignee: Motorola Solutions, Inc., Schaumburg, IL (US)

( * ) Notice: Subject to any disclaimer, the term of this patent is extended or adjusted under 35 U.S.C. 154(b) by 2041 days.

(21) Appl. No.: 11/315,403

(22) Filed: Dec. 22, 2005

(65) Prior Publication Data
US 2007/0150195 A1   Jun. 28, 2007

(51) Int. Cl.
  G01C 21/00   (2006.01)
  G01C 21/08   (2006.01)
  G01C 21/12   (2006.01)
  G01C 21/16   (2006.01)
  G06F 17/00   (2006.01)

(52) U.S. Cl. ........ 701/409; 701/449; 701/500; 701/501; 340/995.25; 340/995.28

(58) Field of Classification Search ........ 701/1, 35, 701/36, 200, 207–208, 213–214, 216–217, 701/220–221, 300, 224, 408, 400, 409, 430, 701/445, 449, 450, 532, 540, 423, 500, 501; 701/530; 33/300, 316, 318–320; 342/357.01–357.02, 357.06–357.07, 357.12–357.14; 340/901, 988, 995.1, 995.12, 995.14, 995.25, 340/995.28

See application file for complete search history.

(56) References Cited

U.S. PATENT DOCUMENTS

| | | | |
|---|---|---|---|
| 5,272,639 A * | 12/1993 | McGuffin | 701/207 |
| 6,179,067 B1 * | 1/2001 | Brooks | 175/45 |
| 6,314,370 B1 | 11/2001 | Curtwright | |
| 6,459,990 B1 | 10/2002 | McCall et al. | |
| 6,493,631 B1 | 12/2002 | Burns | |
| 6,615,136 B1 | 9/2003 | Swope et al. | |
| 2003/0018430 A1 * | 1/2003 | Ladetto et al. | 701/217 |
| 2003/0125875 A1 | 7/2003 | Lee | |
| 2005/0033515 A1 * | 2/2005 | Bozzone | 701/214 |
| 2006/0125644 A1 * | 6/2006 | Sharp | 340/573.1 |

OTHER PUBLICATIONS

PCT/US2006/061774—International Search Report and Written Opinion mailed Mar. 14 2008—8 pages.
Office Action for counterpart Australian Patent Application No. 2006330744 mailed on Sep. 28, 2009.
International Preliminary Report on Patentability for counterpart International Application No. PCT/US2006/061774 mailed on Jul. 3, 2008.

* cited by examiner

*Primary Examiner* — Thomas Tarcza
*Assistant Examiner* — Edward Pipala
(74) *Attorney, Agent, or Firm* — Barbara R. Doutre

(57) ABSTRACT

Method and apparatus of increasing location accuracy of an inertial navigational device is described. The inertial navigation device generates real-time data and transmits the real-time data to a second device so that the second device may obtain a location of the inertial navigational device. The inertial navigational device receives an update message from the second device, wherein the update message is created at the second device based on a comparison of the real-time data generated by the inertial navigational device against a magnetic field database and adjusts the depicted location of the inertial navigational device based on the update message in order to increase the location accuracy of the inertial navigational device.

29 Claims, 5 Drawing Sheets

500
METHOD AND APPARATUS OF OBTAINING IMPROVED LOCATION ACCURACY USING MAGNETIC FIELD MAPPING

FIELD OF THE INVENTION

The present invention relates generally to magnetic field mapping and more specifically to obtaining improved location accuracy using magnetic field mapping.

BACKGROUND

An inertial navigational system (INS) is a type of navigational system or a tracking system used, for example, on aircraft, vehicles, human being or other moving objects to obtain their location information. The working of an INS is based on the measurement of acceleration and rotation rate of a body that is to be tracked. A traditional INS utilizes accelerometers, gyroscopes, electronic compass and support electronics, such as a processor, in order to translate sensor data into motional changes. Navigational information such as velocity, orientation, and position can be determined from the sensor data by computers or other instrumentation.

A typical INS comprises a wireless inertial navigational device and a host device that is in communication with the inertial navigational device. The inertial navigational device can be carried by or transplanted by a user, for example carried by a human being or mounted in, a vehicle or other moving object. The host device can be carried by the INS user in a remote location and can display the location of the user. The inertial navigational device determines the position of the user using, in part, an electronic compass and can communicate this information to the host device, which can, then, display the location of the user.

Existing inertial navigational systems that utilize electronic compasses or other magnetic devices provide variations in location information of a user if the user's inertial navigational device is under the influence of static magnetic field variations. Thus, the position of an INS which incorporates the use of magnetic devices, such as electronic compasses, is only as good as the natural magnetic field accuracy in the area that the magnetic device is being used. If an area that a user is being tracked contains strong magnetic field (B-field) variations, then the accuracy of the INS can be greatly diminished. The B field, or magnetic field variations, can be caused by large magnets, large screen televisions, generators, large iron objects, and other devices that influence the surrounding natural magnetic field. The user can be completely unaware of these variations and can be subjected to unsafe tracking conditions, such as translating the location of the user to a position outside of the required positional resolution rendering the user lost.

For example, in an emergency medical or a security situation, it is essential for an Incident Scene Commander (ISC) to keep track of the First Responders at the scene of a crisis, for example a fire inside a building. Location data of the First Responders, each having an inertial navigational device, can be communicated to the ISC's host computer. The location information of the First Responder's position can then be displayed on the ISC's computer. In such situations, obtaining the precise location of the First Responders is very important. However, if there are large screen televisions, large magnets, generators, large iron objects or other magnetic devices in the building, the location of the First Responders displayed at the ICS's computer can be inaccurate and can lead to confusion and even fatal errors in the crisis management plan.

Thus, there exists a need for a method of obtaining improved location accuracy of an inertial navigational device by correcting real-time data generated at the inertial navigational device in the presence of strong magnetic field variations using magnetic field mapping.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with an embodiment of the present invention.

DETAILED DESCRIPTION

Figure 1:
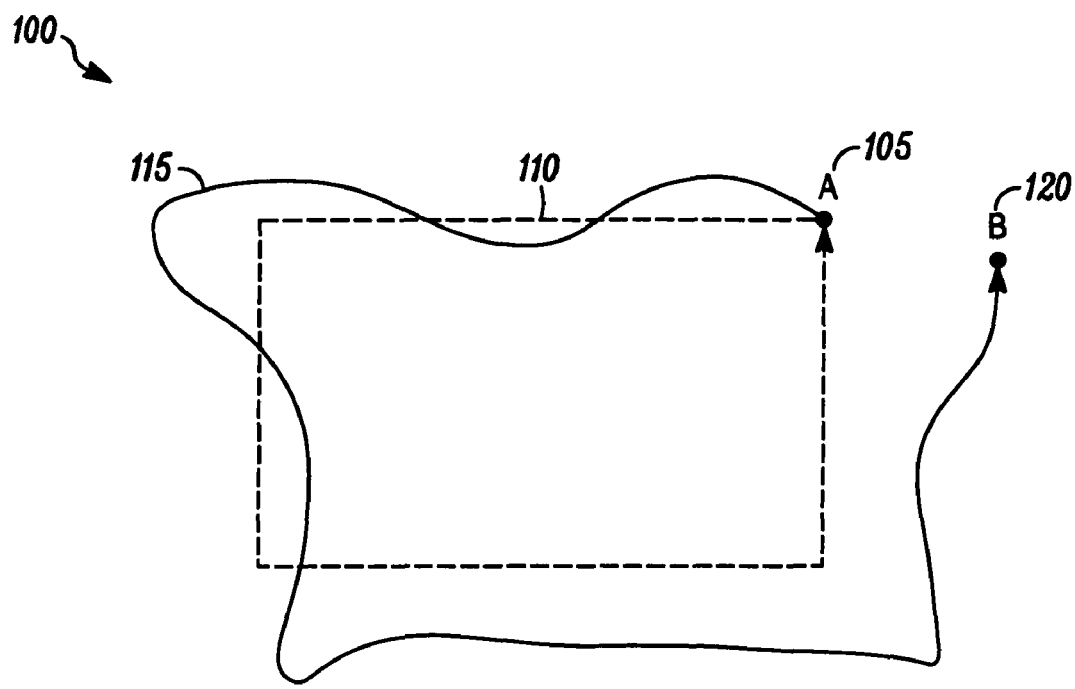
FIG. 1 illustrates movement of a user having an inertial navigational device in accordance with various embodiments of the present invention.

Before describing in detail, embodiments that are in accordance with the present invention, it should be observed that the embodiments reside primarily in combinations of method steps and apparatus components related to obtaining improved location accuracy of an navigational device by correcting real-time data generated at the inertial navigational device using magnetic field mapping. Accordingly, the drawings illustrate conventional symbols, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that embodiments of the invention described herein may be comprised of one or more conventional processors and unique stored program instructions that control the one or more processors to implement, in conjunction with certain non-processor circuits, some, most, or all of the functions of the method and system for obtaining improved location accuracy of an inertial navigational device by correcting a real-time data generated at the inertial navigational device using magnetic field mapping. The non-processor circuits may include, but are not limited to, a radio receiver, a radio transmitter, signal drivers, clock circuits, power source circuits, and user input devices. As such, these functions may be interpreted as steps of a method to perform correction in a real-time data generated at an inertial navigational device using magnetic field mapping. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, the invention discloses obtaining improved location accuracy of an inertial navigational device, e.g. a Portable Inertial Navigational System (PINS), an inertial measurement unit (IMU) or a Personal Tracking Device (PTD) (as those terms are used in the art) using magnetic field (also termed B-field) mapping. Preferably, the inertial navigational device utilizes internal three-axis gyroscopes and accelerometers to capture the motion of a user having a communication device, e.g. a mobile phone that has an embedded inertial navigational device. In any case, translation of the positional changes of the inertial navigational device may be performed through algorithmic processing and the algorithmic processing can occur in the inertial navigational device, a host device or a base computer, or any combination of the three. Magnetic field variations caused, for example, due to large screen televisions, large magnets, some generators, large iron objects and other magnetic devices that influence the surrounding magnetic field in a predefined area can lead to deflection of the electronic compass of the inertial navigational device from the natural magnetic North. Such magnetic field variations can lead to obtaining inaccurate location information of the user of the inertial navigational device.

An embodiment of the present invention proposes a method of correcting for magnetic field variations by introducing a magnetic field database at the host device. The magnetic field database is discussed in detail with reference to FIG. 2. The host device can track the location of the inertial navigational device by correlating the user's motion history against a dimensional rendering of a predefined area where predefined area is associated with where the user is roaming. Those skilled in the art will realize that the above recognized advantages and other advantages described herein are merely exemplary and are not meant to be a complete rendering of all of the advantages of the various embodiments of the present invention.

Referring to FIG. 1, FIG. 1 illustrates movement of a user having an inertial navigational device in a predefined area. Those skilled in the art, however, will recognize and appreciate that the specifics of this illustrative example are not specifics of the invention itself and that the teachings set forth herein are applicable in a variety of alternative settings. For example, since the teachings described do not depend on the number of users being tracked and the number or types of predefined areas that the users are tracked in, an embodiment of the present invention can be applied to any number of users and any number or type of predefined areas, although location of only one user being tracked in a predefined area is shown in one embodiment. As such, other alternative implementations of involving a plurality of users in different predefined areas are contemplated and are within the scope of the various teachings described.

Referring to FIG. 1, the user having an inertial navigational device starts moving from point A 105. The user follows an actual path 110 in the predefined area and stops moving when he reaches back at point A 105. However, due to magnetic field variations caused due to, for example, large screen televisions, large magnets, some generators, large iron objects, or other magnetic devices in the predefined area, the user's inertial navigational device records real-time data corresponding to a distorted path 115. This real-time data corresponding to the distorted path 115, as opposed to the actual path 110, is transmitted to a host device. As is known to one of ordinary skill in the art, a host device can be a personal computer, a personal digital assistant or a server computer that can record and monitor the user's movement. Owing to the distorted path, the host device records the user as having stopped moving at point B 120. The host device displaying the distorted path 115 instead of the actual path 110 of the user can lead to confusion or even fatal errors.

For example, the user can be a fireman and the predefined area can be a building floor that has caught fire. The fireman starts moving at point A 105 to check apartments on the building floor. The fireman follows the path 110 on the building floor and comes back to point A 105. However, due to magnetic field variations caused by large screen televisions, large magnets, generators, large iron objects or other magnetic devices on the building floor, the fireman's inertial navigational device may record inaccurate location information of the fireman. The host device at the fire department receives this inaccurate location information from the fireman's inertial navigational device and the host device may depict the path taken by the fireman as a distorted path 115. This discrepancy between the actual path of the user and the depicted path of the user may create fatal errors in the crisis management plan.

In order to avoid such errors, an embodiment of the present invention proposes using a magnetic field database to improve the location accuracy of the user having the inertial navigational device. In one embodiment, the magnetic field database may reside on the host device and may help in correcting the distorted path due to magnetic field variations.

Figure 2:
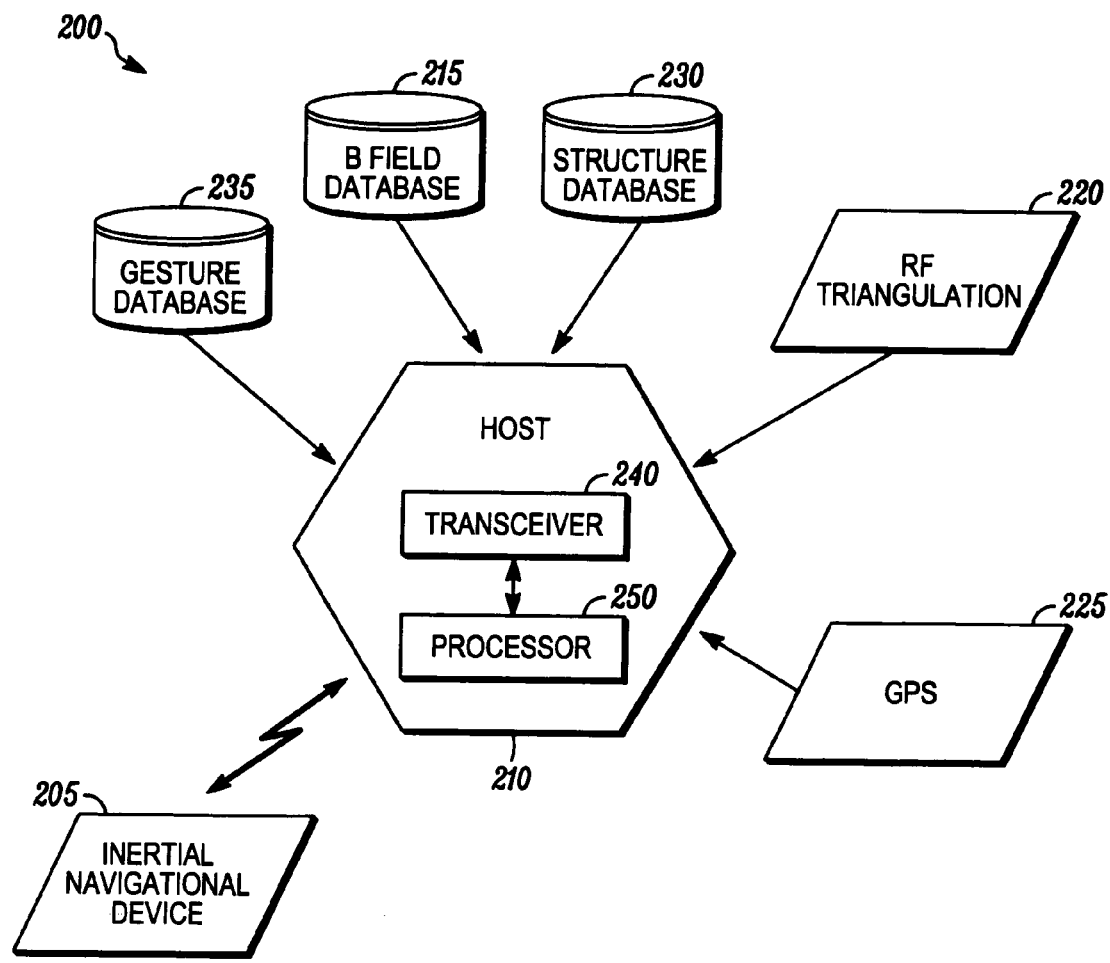
FIG. 2 illustrates a block diagram of the architecture of a tracking system in accordance with various embodiments of the present invention.

In order to illustrate a practical example, shown in FIG. 2 is a tracking system comprising one inertial navigational device in a predefined area. As is readily appreciated by one of ordinary skill in the art, the tracking system may comprise more than one user, where each user has an inertial navigational device and/or each user is in different predefined areas.

Referring to FIG. 2, FIG. 2 illustrates a block diagram of an architecture of a tracking system 200 in accordance with one embodiment of the present invention. An inertial navigational device 205 generates real-time data corresponding to the location of a user having the inertial navigational device 205. In one embodiment, the real-time data can be obtained from sensors embedded in the inertial navigational device 205 and can comprise sensor data, motion data, and location data of the user with respect to a predefined area that the user roams in. As mentioned above, the real-time data can be influenced by magnetic field variations in the predefined area and can be inaccurate.

The inertial navigational device 205 can then wirelessly transmit the real-time data (influenced by the magnetic field variations) to a host device 210 over a radio frequency (RF) channel. In one embodiment, the communication between the inertial navigational device 205 and the host device 210 can be bi-directional, meaning that not only can the inertial navigational device 205 send communications to the host device 210, but the inertial navigational device 205 can also receive communications from the host device 210. In any case, the host device 210 is responsible for providing an indicator of the location of the user in the predefined area. As is known to one of ordinary skill in the art, the host device 210 may comprise, e.g. a laptop, a personal computer or a personal digital assistant (PDA). In any case, the host device 210 can be situated in a remote location, e.g. at a base station or a dispatcher station.

As illustrated in FIG. 2, the host device 210 is responsible for receiving the real-time data from the inertial navigational device 205. This real-time data, which can be an inaccurate estimation of the user's location, can be logged and formatted for processing by the host device 210. Traditionally, in order to get a better estimate of the actual location of the user, the real-time data collected is augmented with other location data, if available, such as RF triangulation 220 or a GPS fix 225, which are generally known in the art. The estimated location is further corrected by using a verification process. In one embodiment, the verification process involves correlation with a structural database 230 comprising the dimensional structure information of the predefined area, a gestures database 235 comprising reference gestures information, and the like.

However, since the verification process, for example, using RF triangulation 220, a GPS fix 225, the structural database 230 and the gestures database 235, does not correct the distorted path for magnetic field variations in the predefined area, the location of the user depicted at the host device 210 using the real-time data sent by the inertial navigational device 205 may still not be accurate enough. A magnetic field database 215 is introduced to correct the inaccuracy in the depicted location of the user caused due to magnetic field variations in the predefined area. Those skilled in the art will appreciate that the magnetic field database 215 can be present in the host device 210 or can be obtained form a remote server, for example a website. In one embodiment of the present invention, the magnetic field database 215 can also reside in the structural database 230.

The magnetic field database 215 is generated by creating magnetic field disturbance maps corresponding to various predefined areas. In one embodiment, the magnetic disturbance maps can be overlaid on blueprints (known in the art) corresponding to the predefined area. In another embodiment, the magnetic disturbance maps can be overlaid on, Geographical Information System (GIS) or aerial maps. In any case, the magnetic disturbance maps are used to create the magnetic field database 215. The magnetic field disturbance maps can be dimensional models of predefined areas. The magnetic field disturbance maps can be created off-line and may be predetermined. According to one embodiment of the present invention, the predetermined magnetic field database 215 can be updated based on a magnetic field disturbance map created periodically. The magnetic field database 215, thus, reflects variations in the magnetic field in the predefined areas.

Furthermore, in one embodiment, the magnetic field database 215 can be optimized in real time, by correcting inaccurate readings received by a host device 210. In such an embodiment, if the magnetic disturbance map is not known a priori, positional generation software could recognize electronic heading inaccuracies by utilizing other location sensor data available from the inertial navigational device 205 or utilize a historical path database to interpolate proper electronic heading inaccuracies versus the real-time data that was received via the inertial navigational device 205. The interpolated headings can then be used to calculate an error vector based on the real-time data received from the inertial navigational device 205 which can then be integrated into the magnetic field database 215 to create a real-time update for the magnetic field database 215 and thus improve the accuracy of the location of the inertial navigational device 205 in the predefined area.

By correlating the real-time data sent by the inertial navigational device 205 with the magnetic field database 215, improved location accuracy of the user having the inertial navigational device 205 is acquired at the host device 210. The correlation can be performed using an algorithm stored in the host device 210 or in the inertial navigational device 205. In one embodiment, this improved location of the user is sent to the user's inertial navigational device 205 wirelessly.

Figure 3:
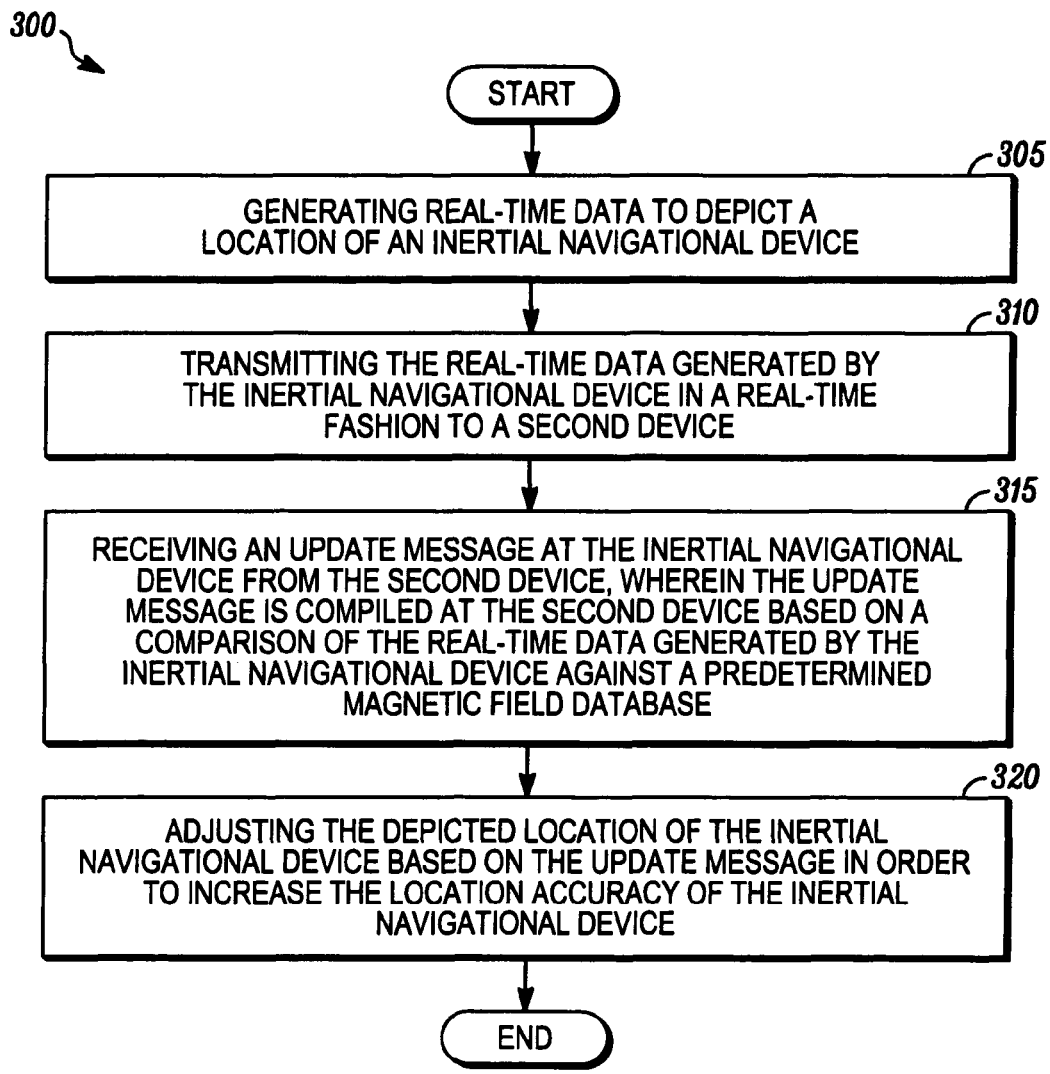
FIG. 3 illustrates a flow diagram for a method of increasing location accuracy in an inertial navigational device in accordance with various embodiments of the present invention.

Referring to FIG. 3, a flow diagram for a method of obtaining increased location accuracy of an inertial navigational device is shown in accordance with one embodiment of the present invention. A user having an inertial navigational device (e.g. 205) may wish to know his or her location in a predefined area. For example, it may be important for a fireman stranded in a building on fire to know his exact location. The method 300 enables a user at a host device to acquire a substantially accurate estimate of the fireman's location in the predefined area. The method 300 comprises the inertial navigational device generating real-time data to depict a location of its user, wherein the real-time data can comprise of sensor data, motion data or location data of the inertial navigational device, step 305. This depicted location, as mentioned earlier, can be inaccurate because of the presence of magnetic field variations in the predefined area, which can be caused by large screen televisions, large magnets, some generators, large iron objects and other magnetic devices. The inertial navigational device transmits the real-time data generated by it (e.g. in a real-time fashion) to a second device, step 310. The second device can be a host device (e.g. 210), which may be remotely located (as mentioned above). Upon receiving the real-time data, the second device may create an update message based on a comparison of the real-time data against a magnetic field database. The magnetic field database (may be predetermined) can be generated either at the second device or at a remote server in communication with the second device, by creating magnetic field disturbance maps corresponding to various predefined areas. Those skilled in the art shall realize that the predetermined magnetic field database can comprise magnetic field disturbance maps for a plurality of predefined areas, e.g. a multi-floor building where the predetermined magnetic field database can comprise magnetic field disturbance maps corresponding to each floor in the multi-floor building. In one embodiment, the magnetic filed database may be updated periodically by creating magnetic field disturbance maps at specific intervals.

After the second device creates the update message, the inertial navigational device 205 receives the update message from the second device, step 315. This update message may contain error correction factors in order to correct the inaccuracy of the user's location as depicted by the inertial navigational device 205 caused by magnetic field variations. In one embodiment, the inertial navigational device adjusts the location (as depicted on the second device) based on the update message in order to increase the location accuracy of the inertial navigational device 205, step 320. In one embodiment, the user is provided an indicator of the updated location. Those skilled in the art will appreciate that the inertial navigational device 205 can comprise a graphical user interface and a dimensional model of the predefined area can be displayed on the graphical user interface. In such an embodiment, an indicator of the location of the user can be displayed on the graphical user interface. The display on the graphical user interface is described in greater detail using FIG. 5. Moreover, the location of the user can also be depicted in three dimensions on the inertial navigational device.

Figure 4:
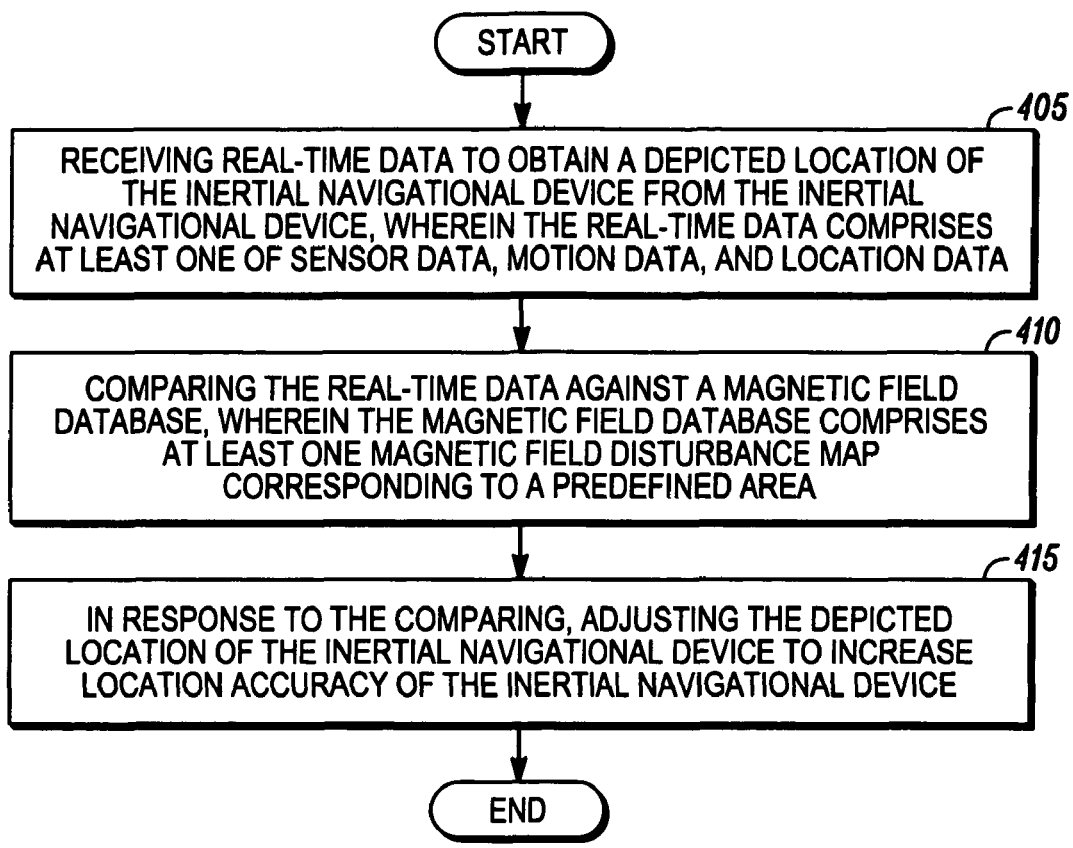
FIG. 4 illustrates a flow diagram of a method of increasing the location accuracy of an inertial navigational device in accordance with various embodiments of the present invention.

Referring to FIG. 4, a flow diagram for a method of obtaining increased location accuracy of an inertial navigational device is shown in accordance with one embodiment of the present invention. The embodiment depicted in FIG. 3 enables a user of the inertial navigational device (e.g. 205) to obtain his or her location in a predefined area. In the embodiment depicted in FIG. 4, a host device (e.g. 210) obtains an indication of the user's inertial navigational device and calculates an improved location based upon utilizing a magnetic field database. In such an embodiment, the user of the inertial navigational device may not necessarily receive improved location accuracy from the host device, but may be provided other information, e.g. directions, in response to the host device's calculation of improved location accuracy. Referring to FIG. 4, the host device receives real-time data from the inertial navigational device to obtain location of the inertial navigational device, step 405. The real-time data may comprise of sensor data, motion data and location data of the inertial navigational device 205. As mentioned previously, the real-time data may be influenced by magnetic variations in the predefined area and as such may be inaccurate. Thus, the location of the inertial navigational device (as depicted on the host device) may not be very accurate. In order to correct the depicted location, the host device compares the real-time data against a magnetic field database, step 410. The magnetic field database may comprise magnetic field disturbance maps corresponding to various predefined areas. In one embodiment, the step of comparing the real-time data against a magnetic field database comprises the host device retrieving a relevant magnetic field disturbance map from the magnetic field database, where the magnetic field disturbance maps is relevant if the maps corresponds to the are that the user is located. Upon comparing the real-time data and the magnetic field database, the host device 210 adjusts the depicted location of the inertial navigational device 205 so that the depicted location of the inertial navigational device has improved location accuracy, step 415. Those skilled in the art shall realize that the host device may comprise a graphical user interface that depicts the improved location accuracy of the inertial navigational device and such interface may display a dimensional model of the predefined areas.

Referring back to FIG. 2, in operation, the host device 210 may comprise a transceiver 240 and a processor 250, where the transceiver 240 and processor 250 are operatively coupled. The transceiver 240 may be in communication with a plurality of inertial navigational devices, including e.g. inertial navigational device 205. The transceiver 240 may be adapted for obtaining the real-time data corresponding to a depicted location of the inertial navigational device 205 from the inertial navigational device 205. The real-time data may be generated at the inertial navigational device 205 and may comprise of sensor data, motion data and location data. This real-time data may be influenced by magnetic variations in the predefined area and may thus cause the depicted location of the user to be inaccurate. The processor 250 may compare the real-time data sent by the inertial navigational device 205 against the magnetic field database 215.

Figure 5:
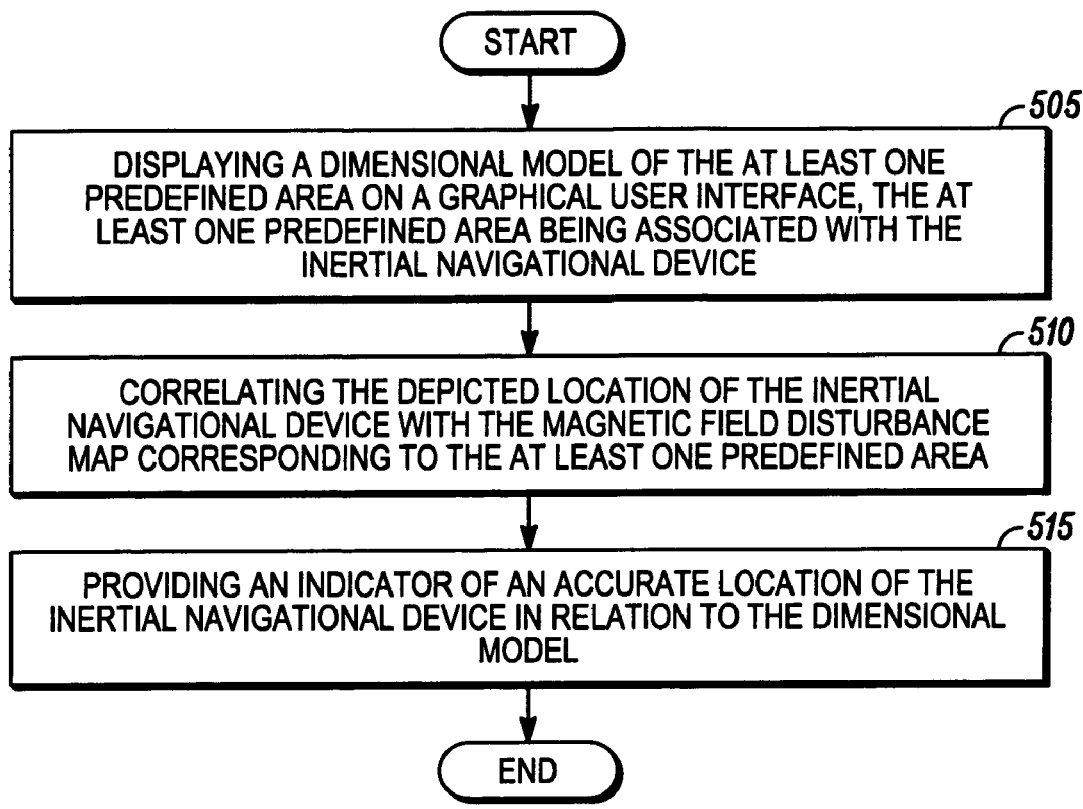
FIG. 5 illustrates a flow diagram of a method for providing a dimensional representation of a user's location in accordance with various embodiments of the present invention.

Referring to FIG. 5, FIG. 5 illustrates a flow diagram of a method for providing a dimensional representation of a user's location in accordance with one embodiment of the present invention. The inertial navigational device (e.g. 205) or the host device (e.g. 210) may comprise a graphical user interface, which may display a dimensional model of the location of a user having the inertial navigational device. The method comprises displaying the dimensional model of the predefined area, which the user roams in, on the graphical user interface, step 505. The inertial navigational device may be in communication with the host device. The host device may correlate the depicted location of the inertial navigational device with a magnetic disturbance map corresponding to the predefined area that the user in roaming in, step 510. The host device may then send the actual location of the inertial navigational device to the user, which may be displayed on the graphical user interface of the inertial navigational device.

In one embodiment, the correlation may be performed at the host device using a magnetic field database (e.g. 215) as mentioned above. Upon correlating the depicted location of the inertial navigational device with a magnetic disturbance map, step 510, the graphical user interface may provide an indicator of an accurate location of the inertial navigational device in relation to the dimensional model of the predefined area, step 515. Those skilled in the art shall appreciate that the host device, may display the location of multiple inertial navigational devices in one predefined area simultaneously or locations of various inertial navigational devices in a plurality of predefined areas simultaneously.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The inventions defined solely by the appended claims including any amendments made during the pendency of this application and all equivalents of those claims as issued.

What is claimed is:

1. A method of increasing location accuracy in an inertial navigational device comprising the steps of:
generating real-time data to depict a location of the inertial navigational device, wherein the real-time data comprises at least one of sensor data, motion data, and location data, the real-time data being an inaccurate estimation of the location influenced by magnetic field variations;
transmitting, wirelessly, the real-time data generated by the inertial navigational device to a second device, the real-time data being the inaccurate estimation of the location influenced by magnetic field variations;
comparing, by the second device, the real-time data generated by the inertial navigational device against a magnetic field database, wherein the magnetic field database is generated and updated by creating at least one magnetic field disturbance map reflecting variations in the magnetic field caused by magnetic devices that influence the surrounding natural magnetic field in at least one predefined area within which a user roams;
in response to the comparison, correcting, by the second device, the real-time data generated by the inertial navigational device by calculating an error vector based upon interpolation of heading inaccuracies from the real-time data and the magnetic field database;
creating and sending, by the second device, an update message to the inertial navigational device based on the correction; and
adjusting the depicted location of the inertial navigational device based on the update message.

2. The method of claim 1, wherein the magnetic field disturbance map is a dimensional model of the at least one predefined area.

3. The method of claim 2 further comprising:
displaying the dimensional model of the at least one predefined area on a graphical user interface, wherein the at least one predefined area is associated with the inertial navigational device;
correlating the depicted location of the inertial navigational device with the magnetic field disturbance map corresponding to the at least one predefined area; and
providing an indicator of the adjusted depicted location of the inertial navigational device on the dimensional model of the graphical user interface.

4. The method of claim 3, further comprising:
simultaneously displaying the location of a plurality of inertial navigational devices, associated with the at least one predefined area, on the graphical user interface.

5. The method of claim 3, further comprising:
simultaneously displaying the location of a plurality of inertial navigational devices, associated with a plurality of predefined areas, on the graphical user interface.

6. The method of claim 1, wherein the magnetic field database is predetermined.

7. The method of claim 1, wherein the depicted location is displayed in three dimensions.

8. The method of claim 1, wherein the real-time data comprises sensor data associated with a location of the inertial navigational device.

9. The method of claim 1, wherein the inertial navigation device is under the influence of non-static field variations caused by unknown external devices including one or more of: large screen televisions, large magnets, some generators, large iron objects and other magnetic devices.

10. The method of claim 1, wherein the magnetic field database is updated by utilizing other location sensor data from the inertial navigational device when magnetic field disturbance map is not known a priori.

11. A device comprising
a transceiver,
a processor operatively coupled to the transceiver and adapted for:
obtaining, wirelessly, real-time data corresponding to a depicted location of an inertial navigational device from the inertial navigational device, wherein the real-time data comprises at least one of sensor data, motion data, and location data, the real-time data being an inaccurate estimation of the location influenced by magnetic field variations;
comparing the real-time data against a magnetic field database, the magnetic field database being generated and updated by creating at least one magnetic field disturbance map reflecting variations in the magnetic field caused by magnetic devices that influence the surrounding natural magnetic field of at least one predefined area within which a user having the inertial navigation device roams;
in response to the comparison, correcting the real-time data by calculating an error vector based upon interpolation of heading inaccuracies from the real-time data and the magnetic field database; and
adjusting the depicted location of the inertial navigational device based on the correction.

12. The device of claim 11, wherein the transceiver is in communication with the inertial navigational device to generate the magnetic field database.

13. The device of claim 12, wherein the magnetic field database further comprises a magnetic field disturbance map that is a dimensional model of the at least one predefined area.

14. The device of claim 13 wherein the processor is further adapted for:
displaying the dimensional model of the at least one predefined area on a graphical user interface, the at least one predefined area being associated with the inertial navigational device;
correlating the depicted location of the inertial navigational device with the magnetic field disturbance map corresponding to the at least one predefined area; and
providing an indicator of an accurate location of the inertial navigational device in relation to the dimensional model.

15. The device of claim 11, wherein the depicted location is displayed in three dimensions.

16. The device of claim 11, wherein the device is enabled for processing the magnetic field database.

17. The device of claim 11 is one of a personal computer, personal digital assistant and a laptop.

18. The method of claim 11, wherein the real-time data comprises sensor data associated with location of the inertial navigational device.

19. The device of claim 11, wherein the inertial navigation device is under the influence of non-static magnetic field variations caused by unknown external devices including one or more of: large screen televisions, large magnets, some generators, large iron objects and other magnetic devices.

20. The device of claim 11, wherein the magnetic field database is updated by utilizing other location sensor data from the inertial navigational device when magnetic field disturbance map is not known a priori.

21. A method of increasing location accuracy of an inertial navigational device comprising the steps of:
receiving, wirelessly, real-time data to obtain a depicted location of the inertial navigational device from the inertial navigational device, wherein the real-time data comprises at least one of sensor data, motion data, and location data, the real-time data being an inaccurate estimation of the location influenced by magnetic field variations;

comparing the real-time data against a magnetic field database, wherein the magnetic field database comprises at least one magnetic field disturbance map corresponding to a predefined area, the magnetic field disturbance map reflecting magnetic field variations caused by magnetic devices that influence the surrounding natural magnetic field in a predefined area within which a user having the inertial navigation device roams;

in response to the comparison, correcting the real-time data by calculating an error vector based upon interpolation of heading inaccuracies from the real-time data and the magnetic field database; and adjusting the depicted location of the inertial navigational device based on the correction.

22. The method of claim 21, further comprising displaying a dimensional model of the at least one predefined area on a graphical user interface, the at least one predefined area being associated with the inertial navigational device;

correlating the depicted location of the inertial navigational device with the magnetic field disturbance map corresponding to the at least one predefined area; and providing an indicator of an accurate location of the inertial navigational device in relation to the dimensional model.

23. The method of claim 22, wherein the correlation can be performed using an algorithm.

24. The method of claim 21, wherein the magnetic field database is updated at predetermined intervals.

25. The method of claim 24, wherein the magnetic field database is available off-line.

26. The method of claim 21, wherein the magnetic field disturbance map comprises a dimensional model of the at least one predefined area.

27. The method of claim 21, wherein the real-time data comprises sensor data associated with location of the inertial navigational device.

28. The method of claim 21, wherein the inertial navigation device is under the influence of non-static field variations caused by unknown external devices including one or more of: large screen televisions, large magnets, some generators, large iron objects and other magnetic devices.

29. The method of claim 21, wherein the magnetic field database is updated by utilizing other location sensor data from the inertial navigational device when magnetic field disturbance map is not known a priori.

* * * * *

UNITED STATES PATENT AND TRADEMARK OFFICE
CERTIFICATE OF CORRECTION

PATENT NO. : 8,296,058 B2  
APPLICATION NO. : 11/315403  
DATED : October 23, 2012  
INVENTOR(S) : Koskan et al.

Page 1 of 1

It is certified that error appears in the above-identified patent and that said Letters Patent is hereby corrected as shown below:

In Column 2, Line 39, delete "an navigational" and insert -- a navigational --, therefor.

In Column 5, Line 61, delete "form" and insert -- from --, therefor.

In Column 7, Line 8, delete "filed" and insert -- field --, therefor.

Signed and Sealed this  
Twelfth Day of February, 2013

Teresa Stanek Rea  
*Acting Director of the United States Patent and Trademark Office*